US012631458B2

(12) United States Patent
Sobus et al.

(10) Patent No.: US 12,631,458 B2
(45) Date of Patent: May 19, 2026

(54) SYSTEMS AND METHODS FOR THE DETECTION OF ROADS

(71) Applicant: Caterpillar Inc., Deerfield, IL (US)

(72) Inventors: Jan Ernest Sobus, Burpengary East (AU); Carrie-Ann Nicole Bynon, Bradford (AU); Russell Allen Brockhurst, Carindale (AU); Gregory Davis, Wakerley (AU); Edward Powers Hillmann, Hemmant (AU)

(73) Assignee: Caterpillar Inc., Peoria, IL (US)

( * ) Notice: Subject to any disclaimer, the term of this patent is extended or adjusted under 35 U.S.C. 154(b) by 112 days.

(21) Appl. No.: 18/633,285

(22) Filed: Apr. 11, 2024

(65) Prior Publication Data

US 2025/0321106 A1 Oct. 16, 2025

(51) Int. Cl.
*G01C 21/26* (2006.01)
*B60W 30/14* (2006.01)
*G01C 21/00* (2006.01)

(52) U.S. Cl.
CPC ........... *G01C 21/26* (2013.01); *B60W 30/143* (2013.01); *G01C 21/3819* (2020.08); *G01C 21/3822* (2020.08); *B60W 2556/55* (2020.02); *B60W 2720/10* (2013.01)

(58) Field of Classification Search
None
See application file for complete search history.

(56) References Cited

U.S. PATENT DOCUMENTS

| | | | |
|---|---|---|---|
| 5,850,341 A | 12/1998 | Fournier | |
| 5,944,764 A | 8/1999 | Henderson | |
| 8,874,361 B2* | 10/2014 | Krumm | G01C 21/3841 |
| | | | 701/410 |
| 9,046,371 B2 | 6/2015 | Casson | |
| 9,322,660 B2* | 4/2016 | Mund | G01C 21/3841 |
| 9,613,468 B2* | 4/2017 | Davidson | G06Q 10/06398 |
| 9,633,564 B2* | 4/2017 | Ferguson | G01C 21/3819 |
| 9,816,823 B2* | 11/2017 | Wang | G01C 21/3617 |
| 11,499,833 B2* | 11/2022 | Bulan | G01C 21/3819 |
| 11,691,648 B2* | 7/2023 | Theverapperuma | G06N 3/096 |
| | | | 701/25 |
| 2011/0148856 A1 | 6/2011 | Sprock | |
| 2012/0330550 A1 | 12/2012 | Jensen | |
| 2015/0066352 A1 | 3/2015 | Sugihara | |
| 2015/0134184 A1 | 5/2015 | Takeda | |
| 2015/0167461 A1 | 6/2015 | Sugihara | |
| 2015/0233716 A1 | 8/2015 | Sugihara | |
| 2022/0366336 A1* | 11/2022 | Khasis | G08G 1/04 |
| 2024/0094027 A1* | 3/2024 | Seiler | G08G 1/202 |

FOREIGN PATENT DOCUMENTS

WO WO2015060179 A1 4/2015

* cited by examiner

*Primary Examiner* — Todd Melton

(57) ABSTRACT

A system and method for generating or updating roads in a travel network of a work site. Telemetry data received from machines operating at the work site is received by a road determination module. The road determination module analyzes the telemetry data to find similar trajectories. The similar trajectories are identified as a road. The route determination module thereafter uses the roads generated or updated to manage the machines at the work site.

19 Claims, 5 Drawing Sheets

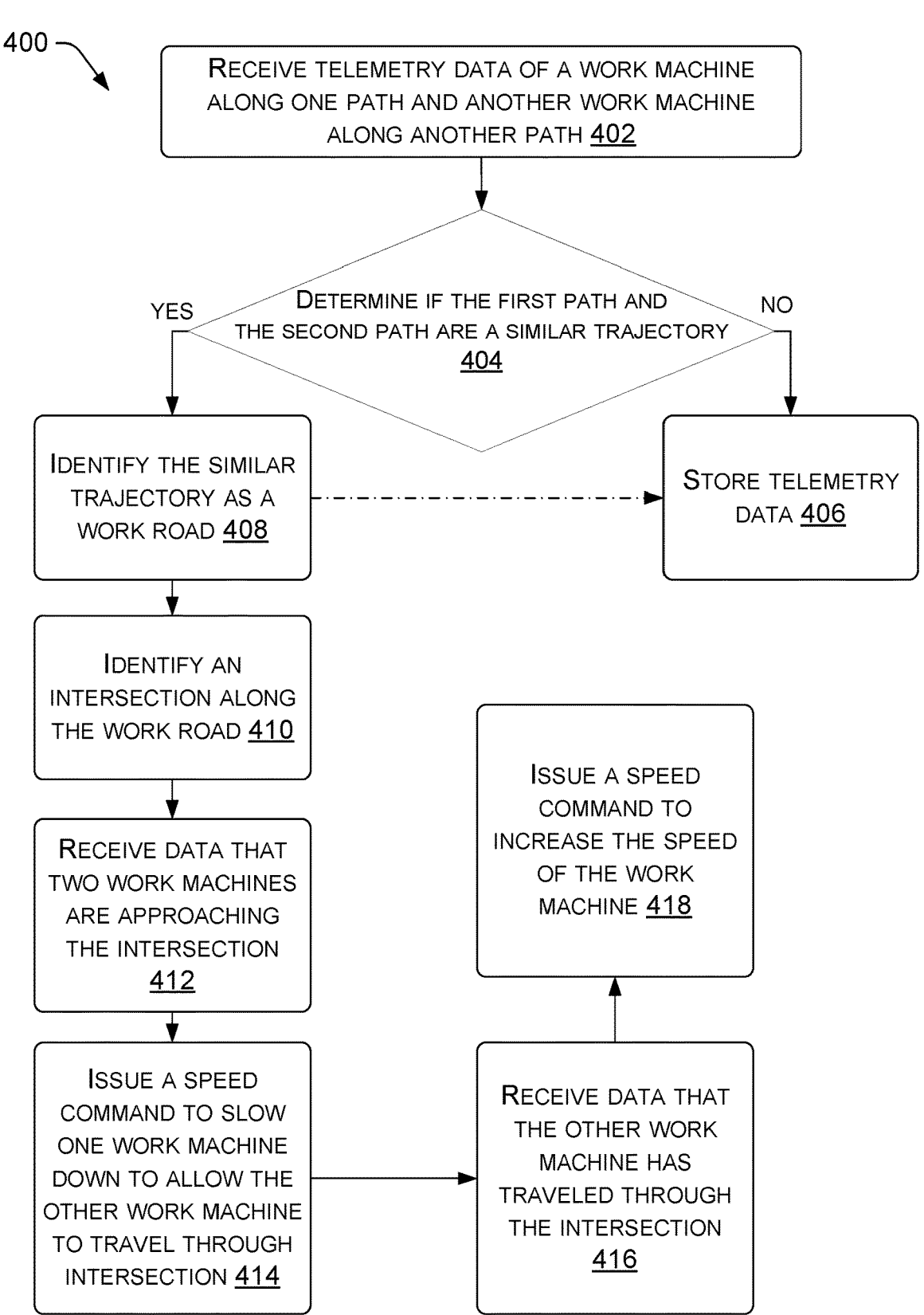

400

RECEIVE TELEMETRY DATA OF A WORK MACHINE ALONG ONE PATH AND ANOTHER WORK MACHINE ALONG ANOTHER PATH 402

DETERMINE IF THE FIRST PATH AND THE SECOND PATH ARE A SIMILAR TRAJECTORY 404

YES

NO

IDENTIFY THE SIMILAR TRAJECTORY AS A WORK ROAD 408

STORE TELEMETRY DATA 406

IDENTIFY AN INTERSECTION ALONG THE WORK ROAD 410

ISSUE A SPEED COMMAND TO INCREASE THE SPEED OF THE WORK MACHINE 418

RECEIVE DATA THAT TWO WORK MACHINES ARE APPROACHING THE INTERSECTION 412

ISSUE A SPEED COMMAND TO SLOW ONE WORK MACHINE DOWN TO ALLOW THE OTHER WORK MACHINE TO TRAVEL THROUGH INTERSECTION 414

RECEIVE DATA THAT THE OTHER WORK MACHINE HAS TRAVELED THROUGH THE INTERSECTION 416

FIG. 4

SYSTEMS AND METHODS FOR THE DETECTION OF ROADS

TECHNICAL FIELD

The present disclosure relates generally to systems and methods for detecting roads used by machines.

BACKGROUND

Machines such as earthmovers or haul trucks move along various paths in a work site. The paths may be between a dump site and a load site, from a load site to a charging site or other types of routes depending on the type of worksite e.g., a construction site, a mine site or a quarry. In some situations, these paths may change over time. For example, the machine may be used in an excavation operation of a mine. As dirt or material is removed from the work site, the site where the removed material is loaded from, or dumped onto, may change. When managing a work site, it can be helpful to manage the movement of machines throughout the work site esp. given the changing orientations of the routes/paths. For example, Fleet Management Systems (FMS) typically use a virtual model of a mine site to produce accurate production records and determine optimal assignments for haul trucks and other machines. These virtual models are typically created and maintained by personnel using surveys, geolocated topographic maps and aerial photos. As requirements for the fidelity of these virtual maps increases, so too does the amount of effort involved in creating and maintaining them. When travel paths change, the location of the machines may need to be detected and maintained to monitor the operations of the work site.

One approach for detecting a location of a machine is described in U.S. Patent Publication 2015/066352 to Motohide et. al (hereinafter referred to as "the '352 publication"). The '352 publication describes a mining machine management system that uses position information detection units attached to mining machines. The position information is used to identify locations such as discharge stations where loads are removed, a loading station where the machine is loaded, and to determine if the machine is within a predetermined range of previously identified loading, unloading, and other relevant operational locations. However, the management system disclosed in the '352 publication is limited in that routes traveled by the mining machine are known ahead of time. The management system of the '352 application uses nodes to monitor the location and travel of the mining machine. Thus, in an environment in which travel routes, loading sites, unloading sites, and other operational locations change, the use of the management system of the '352 may be limited.

SUMMARY

In an aspect of the present disclosure, a method of detecting a road includes receiving first telemetry data from a first machine, the first telemetry data comprising a plurality of first positions of the first machine along a first travel path from an origination location to a destination location, receiving second telemetry data from a second machine, the second telemetry data comprising a plurality of second positions of the second machine along a second travel path from the origination location to the destination location, determining that the plurality of first positions along the first travel path and the plurality of second positions along the second travel path comprises a similar trajectory, based on determining that the plurality of first positions along the first travel path and the plurality of second positions along the second travel path comprises the similar trajectory, identifying the similar trajectory as a road In an additional aspect of the present disclosure, a network includes a memory storing computer-executable instructions, and a processor in communication with the memory, the computer-executable instructions causing the processor to perform acts comprising receiving first telemetry data from a first machine, the first telemetry data comprising a plurality of first positions of the first machine along a first travel path from an origination location to a destination location, receiving second telemetry data from a second machine, the second telemetry data comprising a plurality of second positions of the second machine along a second travel path from the origination location to the destination location, determining that the plurality of first positions along the first travel path and the plurality of second positions along the second travel path comprises a similar trajectory, and based on determining that the plurality of first positions along the first travel path and the plurality of second positions along the second travel path comprises the similar trajectory, identifying the similar trajectory as a road.

In a still further aspect of the present disclosure, a non-transitory computer-readable media storing computer-executable instructions that, when executed by one or more processors, cause the one or more processors to perform operations including receiving first telemetry data from a first machine, the first telemetry data comprising a plurality of first positions of the first machine along a first travel path from an origination location to a destination location, receiving second telemetry data from a second machine, the second telemetry data comprising a plurality of second positions of the second machine along a second travel path from the origination location to the destination location, determining that the plurality of first positions along the first travel path and the plurality of second positions along the second travel path comprises a similar trajectory, and based on determining that the plurality of first positions along the first travel path and the plurality of second positions along the second travel path comprises the similar trajectory, identifying the similar trajectory as a road.

BRIEF DESCRIPTION OF DRAWINGS

FIG. 4 is a flowchart depicting a method of managing machines at a work site, in accordance with various examples described herein.

DETAILED DESCRIPTION

Wherever possible, the same reference numbers will be used throughout the drawings to refer to same or like parts.

Figure 1:
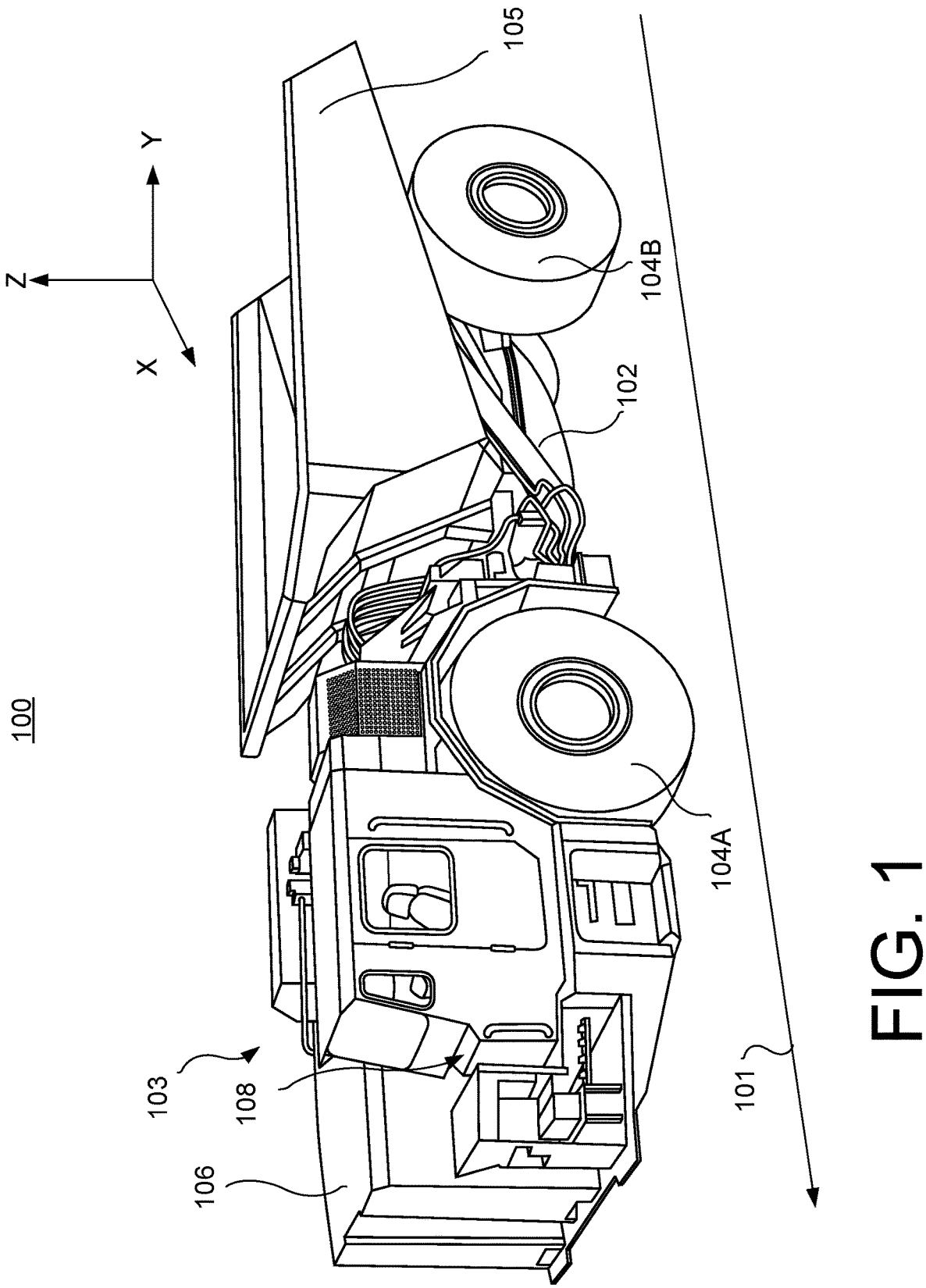
FIG. 1 is a perspective view of a machine within an XYZ coordinate system as one example suitable for use with the principles disclosed in the present disclosure.

FIG. 1 illustrates a perspective view of an exemplary machine 100, within an XYZ coordinate system, capable of realizing embodiments of the present disclosure. The exemplary machine 100 travels parallel to the X axis along a roadway, also termed a travel path 101, typically from a source to a destination within a worksite. In one implementation as illustrated, machine 100 is a hauling machine that hauls a load within or from a worksite within a mining operation. As used herein, "travel path" is used to describe the position of the machine 100 in a coordinate system e.g., the coordinate system XYZ as exemplarily shown in FIG. 1. As explained in reference to FIGS. 2-4, a "road" as used herein describes a pathway associated with one more travel paths of one or more machines 100. Various aspects of the present disclosure use roads to manage operations at a work site. Returning to FIG. 1, the machine 100 may haul ore or other earthen materials from an excavation area along the travel path 101 by loading a bucket 105 to dump sites and then return to the excavation area. In such a scenario, the machine 100 may be one of many similar machines configured to ferry earthen material in a trolley arrangement. While a large mining truck is described herein, the present disclosure is not limited to the machine 100 being a haul truck, as the machine 100 may be any vehicle used on a work site or a machine that carries a load to and from different locations within a worksite, examples of which may include an articulated truck, a water truck, an off-highway truck, an on-highway dump truck, a tractor scraper, or any other machine known in the art and configured to perform an operation on a surface of the earth, an operation below the surface of the earth (such as an underground mining operation), or transport material. Alternatively, the machine 100 may be an off-highway truck, on-highway truck, a dump truck, an articulated truck, a loader, an excavator, a pipe layer, or a motor grader. In other implementations, the machine 100 need not haul a load and may be any machine associated with various industrial applications including, but not limited to, mining, agriculture, forestry, construction and other industrial applications.

Continuing with FIG. 1, the machine 100 includes a frame 103 powered by an electric motor 102 to cause rotation of traction devices, such as traction devices 104A and 104B. Traction devices 104A and 104B are typically four or more wheels with tires, although tracks or other mechanisms for engagement with the ground along travel path 101 are possible. The electric motor 102, powered by a battery 106, functions to provide mechanical energy to the machine 100. An example of mechanical energy, or motive energy, provided by electric motor 102 includes propelling traction devices 104A and 104B to cause movement of the machine 100 along travel path 101. The electric motor 102 also includes components sufficient to power other affiliated operations within the machine 100. For instance, in some implementations, the electric motor 102 includes equipment for converting electrical energy to provide pneumatic or hydraulic actions within the machine 100. While the machine 100 is described as being electrically powered using the battery 106, the present disclosure is not limited to electrically powered vehicles, as other types of vehicles e.g., machines driven by fuel powered engines, hybrid electric machines, battery electric machines are considered to be within the scope of the present disclosure.

In accordance with embodiments herein, the machine 100 further includes a telemetry sensor 108. The telemetry sensor 108 is configured to record various types of data associated with the machine 100 and transmit such recorded data to a route detector network that is described in conjunction with FIG. 2. In an embodiment, the telemetry sensor 108 may be configured to record geographic or positional information e.g., geolocation data and elevation data of the machine 100 along the travel path 101. The telemetry data of telemetry sensor 108 may also be used to determine, by way of example and not by way of limitation, a speed of the machine 100, acceleration/deceleration of the machine 100, a pose of the machine received from a sensor such as, but not limited to, an onboard inertial measurement unit (IMU), a location of a loading area, a location of a dumping area, a location of a fuel bay, and/or a location of a charge station. For example, telemetry data transmitted by the telemetry sensor 108 can be used to determine a loading area or a dumping area by also including data associated with the bucket 105, e.g., the weight or change of weight of material in the bucket 105, wait times from time stamps, etc. The positions of the machine 100 are used to determine one or more roads, described in reference to FIG. 2.

Figure 2:
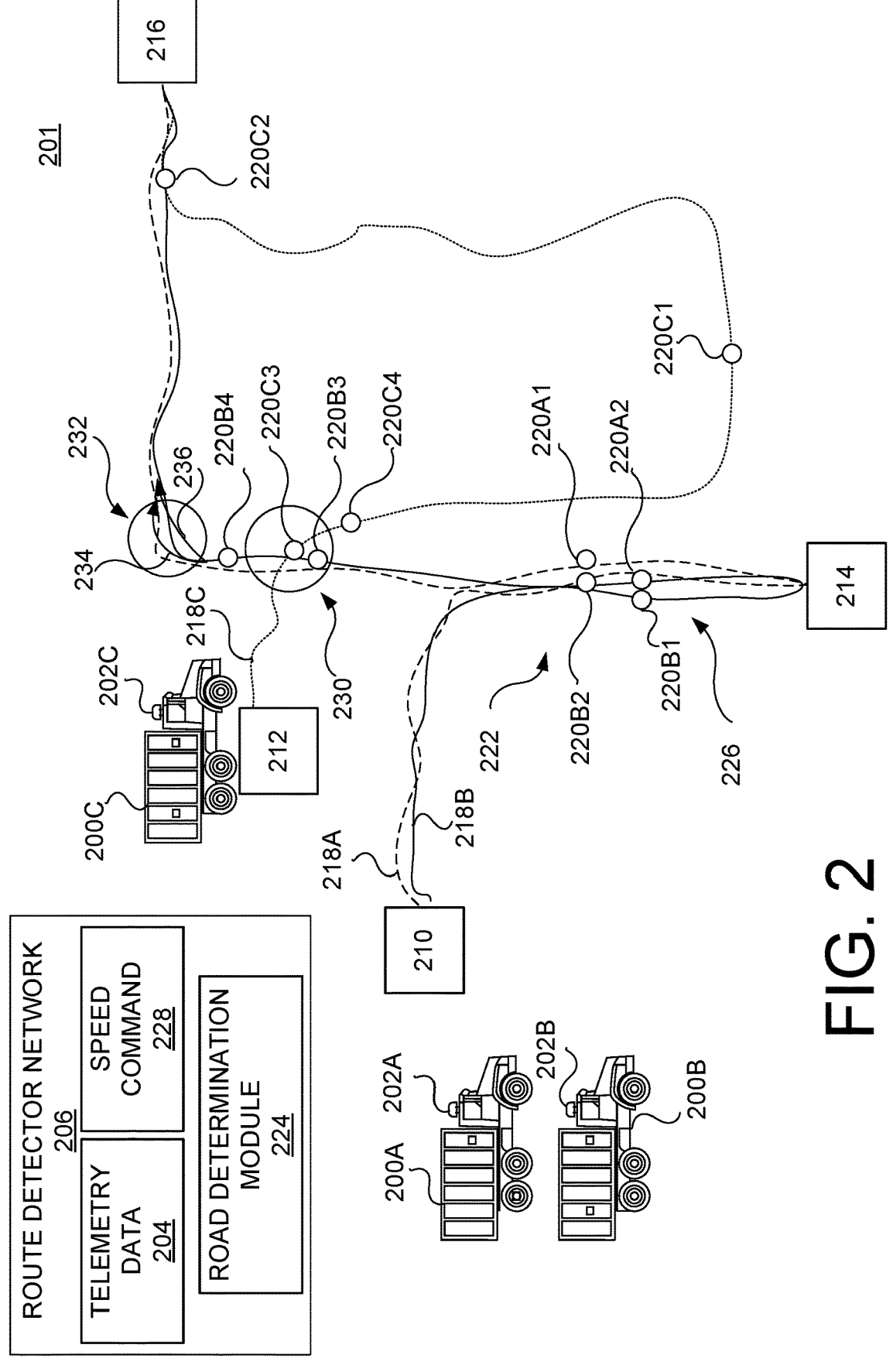
FIG. 2 is a diagrammatic vice of awork site that uses a route detector network to update or generate a road based on detected locations of machines in the work site, in accordance with one or more examples of the present disclosure.

FIG. 2 illustrates work site 201 that uses a route detector network to update or generate a road based on detected locations of machines in the work site 201, in accordance with one or more examples of the present disclosure. Illustrated are machines 200A, 200B, and 200C (hereinafter individually referred to as "the machine 200A," "the machine 200B," and "the machine 200C," and collectively as "the machines 200"). Each of the machines 200 include a telemetry sensor, illustrated as a telemetry sensor 202A on the machine 200A, a telemetry sensor 202B on the machine 200B, and a telemetry sensor 202C on the machine 200C (hereinafter individually referred to as "the telemetry sensor 202A," "the telemetry sensor 202B," and "the telemetry sensor 202C," and collectively as "the telemetry sensors 202"). As mentioned above, the telemetry sensors 202 collect and transmit various types of data 204 to a route detector network 206. The telemetry data 204 can include, but is not limited to, a geographic or positional information of the machines 200, a speed of the machines 200, a time during the operation of the machines 200, an acceleration/deceleration of the machines 200, a location of a loading area used by the machines 200, a pose of one or more of the machines 200, a location of a dumping area used by the machines 200, a location of a fuel bay used by the machines 200, and/or a location of a charge station used by the machines 200. The route detector network 206 uses the telemetry data 204 to determine one or more roads on a work site 201.

The work site 201 includes locations 210, 212, 214, and 216, though it should be noted that the locations 210, 212, 214, and 216 are merely exemplary and illustrative in nature, as more or fewer locations may be used and be within the scope of the present disclosure. In FIG. 2, the location 210 is an origination location for the machines 200A and 200B and the location 212 is an origination location for the machine 200C. As used herein, an "origination location" is merely used to describe a starting point for the location of telemetry data and is not specific to any particular operational use, such as a storage area, parking area, and the like. In FIG. 2, the locations 214 and 216 are destination locations. As used herein, a "destination location" is merely used to describe a location to which the machine 200 travel. Examples of destination locations can include the aforementioned loading area, dumping area, fuel bay, and/or a charge station. The present disclosure is not limited to any particular type of destination location. Further, a destination location may also be an origination location. For example, the machines 200 may perform some operation at the location 214 and then travel to the location 216. In this example, the location 214 may be a destination location when the machines 200 arrive at the location 214 and an origination location when the machines 200 leave the location 214 and travel to another location, such as the location 216.

Illustrated in FIG. 2 are travel paths 218A (dashed line), 218B (solid line), and 218C (dotted line) on the work site 201. The machine 200A travels the travel path 218A from the location 210, to the location 214, and finally to the location 216. The machine 200B travels the travel path 218B from the location 210, to the location 214, and finally to the location 216. The machine 200C travels the travel path 218C from the location 212, to the location 216. As noted above, the route detector network 2065 uses telemetry data 204 collected from the machines 100 to determine one or more roads that may be used to manage operations on the work site 201. Telemetry data from the travel path 218A of the machine 200A includes positions 220A1 and 220A2. Telemetry data 204 from the travel path 218B of the machine 200B includes positions 220B1 and 220B2. Telemetry data from the travel path 218C of the machine 200C includes positions 220C1 and 220C2. It should be noted that the telemetry data 204 may include more positions than those illustrated in FIG. 2, as an increase in the amount of position data may increase an accuracy of a determination of a road.

As noted above, the route detector network 206 receives the telemetry data 204 from the machines 200 and uses that telemetry data 204 to determine the location of one or more roads. For example, the route detector network 206 receives the telemetry data 204 of positions 220A1/220A2 and the telemetry data of positions 220B1/220B2. The route detector network 206 compares the telemetry data 204 of positions 220A1/220A2 and the telemetry data of positions 220B1/220B2 to determine if the travel path 218A and 218B at area 222 comprises a road. To do that, in one example, the difference in position locations is compared and, if within a predetermined distance, the area around the position locations is determined to be a road. Travel within the predetermined distance is considered to be travel by the work machines using a similar trajectory. As used herein, "a similar trajectory" results when the travel of machines 200 generate positions 220 are within a predetermined distance, overlap, and/or repeat. For example, the predetermined distance may be 5 feet (by way of example). A road determination module 224 compares the position 220A1 with the position 220B2. If the position 220A1 is within 5 feet of the position 220B2, indicating a similar trajectory or location between the machine 200A and the machine 200B at the area 222, the road determination module 224 determines that that area 222 is a road. In some examples, the detected road may be compared to additional data sources such as survey data collected by drones providing data such as, but not limited to, orthophotos and digital surface models (DSM).

The road determination module 224 continues to perform similar determinations to connect additional roads. For example, the road determination module 224 compares the position 220A2 with the position 220B1. If the position 220A2 is within 5 feet of the position 220B1, indicating a similar trajectory or location between the machine 200A and the machine 200B at area 226, the road determination module 224 determines that that area 226 is a road. The road determination module 224 may thereafter connect the area 222 to the area 226 to generate a longer road. In a similar manner, the road determination module 224 compares the position 220A1 with the position 220C1. If the position 220A1 is not within 5 feet of the position 220C1, indicating a dissimilar trajectory between the machine 200A and the machine 200C, the road determination module 224 determines a road does not exist. Additional telemetry data 204 may be received from other machines (not illustrated). Further, the road determination module 224 may use a time associated with the telemetry data 204 to associate a road with a particular work shift of the work site 201, thus building a shift-based travel network of the machines 200. The travel paths can also be associated with a type of the machine 200 providing the telemetry 204 to identify travel paths as being associated with particular types of machines. For example, the machine 200A may be a hauler and the machine 200B may be an excavator. The route detector network 206 may receive the type of machine and identify the particular travel path as being associated with that particular type of machine.

In some examples, the roads and the telemetry data 204 may be used to determine if a machine is traveling on a correct or approved travel path. For example, the travel path 218C may be used by light vehicles such as a small truck or car. Thus, the travel path 218C may be designed to only handle a certain amount of weight. In this example, the machine 200A may be a hauler that exceeds a weight limit of the travel path 218C. If the machine 200A provides telemetry data 204 that indicates that the machine 200A is located at the position 220C1, the road determination module 224 can determine if that position is within a degree of error to indicate that the machine 200A is traveling on or near the travel path 218A. For example, if the allowable positional error is 5 feet and position 220C1 is 40 feet from positions on the travel path 218, the route detector network 206 may generate a warning indicating a potential deviation of the machine 200 from the travel path 218A. In some examples, the route detector network 206 may issue a speed command 228 to the machine 200A to cause the machine 200A to slow or stop, thus managing travel of the machines 200 at the work site.

In still further examples, the road determination module 224 may use the telemetry data 204 to determine if the road is not usable by one or more of the machines 200. For example, the road determination module 224 may determine that a road area 232 has a curve 234 that the machines 200 experience when traveling through the area 232. However, the road determination module 224 may determine that the curve 234 may be too significant (or unusable) to allow safe travel of the machine 200C. The determination that the curve 234 may be unusable may be based on various factors such as, but not limited to, the weight of the machine 200C or the performance capabilities of the machine 200C. Thus, in some examples, the road determination module 224 can determine that the road area 232 is not suitable for use by the machine 200C, and thus, exclude the machine 200C from using the area 232. In other examples, the road determination module 224 may determine that the road area 232 can be used by the machine 200C if certain limitations are placed on the machine 200C, such as the speed of the machine 200C being below by a predetermined speed (i.e., a speed limit) or a weight of the machine 200C being below a predetermined weight (i.e., a weight limit). In still further examples, in addition or in lieu of other limitations, the road determination module 224 may adjust the travel paths 218A and 218B to generate an alternative curve 236 thru the area 232 that is usable by the machine 200C with or without additional limitations.

The route detector network 206 may also manage the travel of the machines 200 by managing the entrance and exit of the machines 200 into and from intersections. An intersection, such as intersection 230, is a location whereby two or more travel paths, such as the travel paths intersect. In one example, travel paths "intersect" to form an intersection when the travel paths have one or more similar locations of travel and one or more divergent locations. For example, the intersection 230 is identified by the road determination module 224 using positions 220B3 and 220B4 along the travel path 218B and positions 220C3 and 220C4 along the travel path 218C. As illustrated in FIG. 2, the positions 220B3 and 220C3 are similar locations, meaning the positions 220B3 and 220C3 are within a predetermined distance, overlap, or repeat. However, the positions 220B4 for the travel path 218B and 220C4 for the travel path 218C are not similar, meaning, the positions 220B4 and 220C4 diverge by not being within a predetermined distance, are not overlapping, or are not repeating. In some examples, although not illustrated, additional locations (or clusters of locations) may be used by the road determine module 224 to further identify the intersection 230. The above example of identifying an intersection is an example, as other methods may be used to determine an intersection and are considered to be within the scope of the present disclosure.

At intersection 230, the travel path 218C intersects, or overlaps, with the travel paths 218A and 218B. A machine traveling along either of the travel paths may encounter another machine traveling along another travel path, requiring the machine to either stop or slow down. The route detector network 206 may manage intersections using the telemetry data 204. For example, if the machines 200A and 200C are approaching the intersection 230, the route detector network 206 can issue the speed command 228 to the machine 200A to slow the machine 200A to a lower speed to allow the machine 200C to enter and exit the intersection 230. As the machine 200C exits the intersection 230, the route detector network 206 can issue the speed command 228 to the machine 200A to cause the machine 200A to travel at a higher speed. The route detector network 206 can further manage the work site 201 by using telemetry data 204 to determine inclines and declines for energy usage, as described in reference to FIG. 3.

Figure 3:
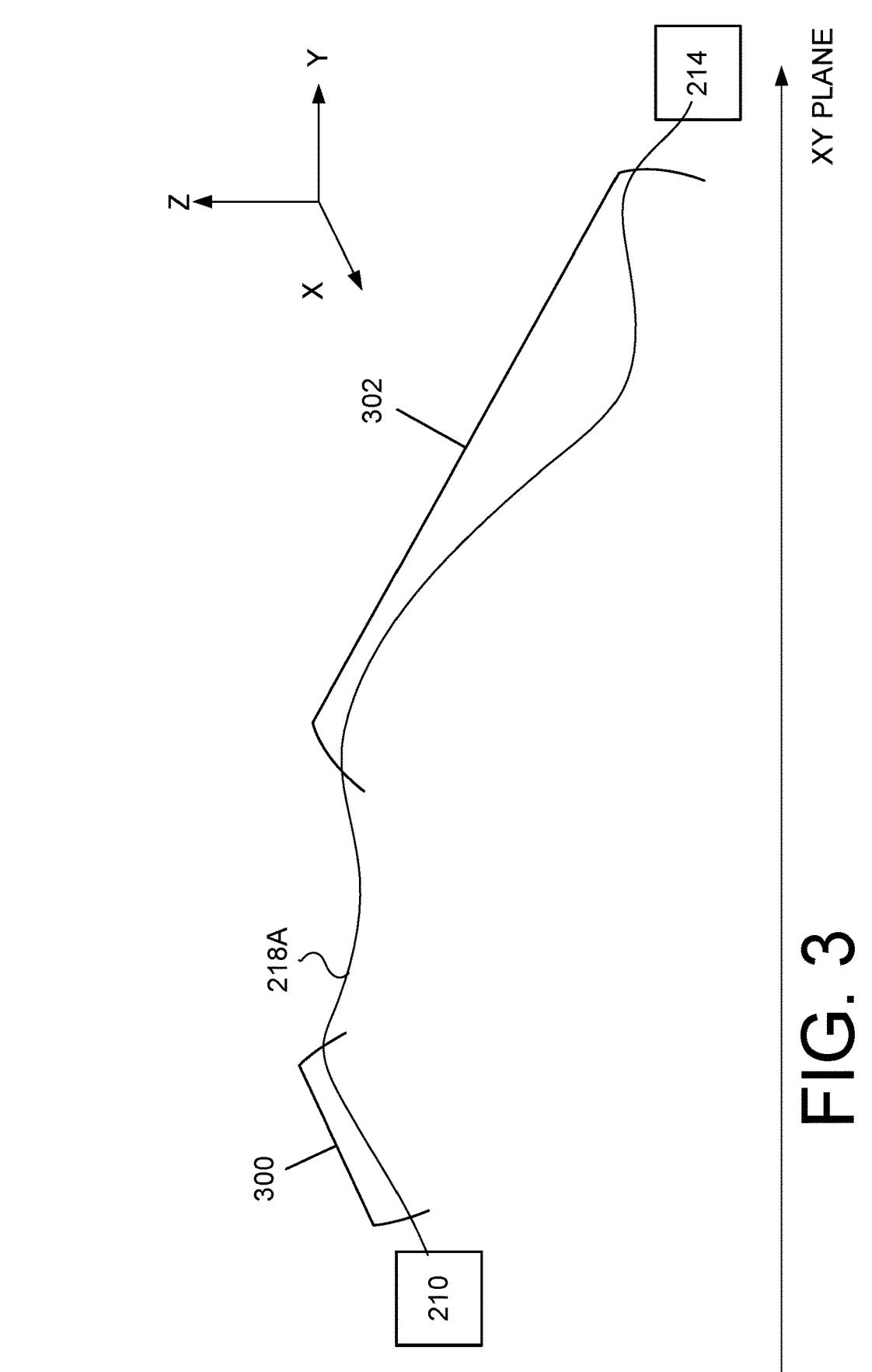
FIG. 3 is a road showing elevation data used to detect segments of inclines and declines on the road, in accordance with various examples of the present disclosure.

FIG. 3 illustrates a road showing elevation data used to detect inclines and declines of the road, in accordance with various examples of the present disclosure. In FIG. 3, the travel path 218A is illustrated from the location 210 to the location 214. Using the XYZ coordinate system described in FIG. 1, the telemetry data 204 graphed in the XZ coordinate system indicates a changing height of the travel path 218A from a reference level, such as ground level. As shown in FIG. 3, the portion 300 of the travel path 218A indicates that the portion 300 is an incline having a percent grade, which can be stored as percent grade data in the telemetry data 204. Similarly, the portion 302 of the travel path 218A indicates that the portion 302 is a decline. The determination of an incline and decline may be used for various purposes, including energy usage of a machine traveling along the travel path 218A.

For example, the machine 200A may be traveling along the travel path 218A. The machine 200A may be a battery powered machine that can use regenerative braking to provide a charge to a battery used by the machine 200A. Regenerative braking is an energy recovery method that slows down the machine 200A by converting the kinetic energy of the machine 200A into electrical power used to charge the battery. In this example, the route detector network 206 can determine that the decline of the portion 302 (or a segment of the decline) is sufficient to provide for a regenerative braking segment in which regenerative braking can be used. The route detector network 206 may therefore manage the machine 200A using the portion 302 as a means to recharge the battery that powers the machine 200A, thus managing the machine 200A, illustrated in reference to FIG. 4.

FIG. 4 is a flowchart depicting a method 400 of managing machines at a work site using telemetry data to determine roads, in accordance with various examples described herein. The method 400 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For disclosure purposes, the method 400 may be described with reference to the route detector network 206, however other environments may also be used.

At step 402, the route detector network 206 receives telemetry data 204 of the machine 200A along the travel path 218A and the machine 200B along the travel path 218B. The telemetry data 204 can include, but is not limited to, a geographic or locational position of the machines 200, a speed of the machines 200, a travel time associated with traveling along the travel path 218A, an acceleration/deceleration of the machines 200, a location of a loading area used by the machines 200, a location of a dumping area used by the machines 200, a location of a fuel bay used by the machines 200, and/or a location of a charge station used by the machines 200.

At step 404, the route detector network 206 determines if the travel path 218A and the travel path 218B have a similar trajectory. To perform step 404, the route detector network 206 compares the difference in position locations along the travel paths and, if within a predetermined distance, the area around the position locations is determined to have a similar trajectory. As provided by way of example in FIG. 2, the predetermined distance may be 5 feet (by way of example). The road determination module 224 compares the position 220A1 with the position 220B2. If at step 404 the route detector network 206 determines that the location is not a similar trajectory, at step 406, the route detector network 206 stores the telemetry data 204. If at step 404 the route detector network 206 determines that the location is a similar trajectory, at step 408, the route detector network 206 identifies the area as a road.

Steps 410-418 is an example of the use of the roads to manage travel of the machines 200 through an intersection. At step 410, the route detector network 206 identifies an intersection. An intersection, such as intersection 230, is a location whereby two or more travel paths, such as the travel paths intersect. At intersection 230, the travel path 218C intersects, or overlaps, with the travel paths 218A and 218B. A machine traveling along either of the travel paths may encounter another machine traveling along another travel path, requiring the machine to either stop or slow down.

At step 412, the route detector network 206 receives telemetry data 204 that two machines are approaching the intersection 230 at speeds that may indicate that the two machines may enter the intersection 230 at the same time.

At step 414, to manage the entrance and exit of the machines 200 through the intersection 230, the route detector network 206 can issue the speed command 228 to change the speed of one or both of the machines. For example, if the machines 200A and 200C are approaching the intersection 230, the route detector network 206 can issue the speed command 228 to the machine 200A to slow the machine 200A to a lower speed to allow the machine 200C to enter and exit the intersection 230.

At step 416, the route detector network 206 receives telemetry data that one of the machines has traveled through the intersection, thus opening the intersection for the other machine to travel. At step 418, the route detector network 206 issues the speed command 228 to increase the speed of the machine that has yet to enter the intersection.

Figure 5:
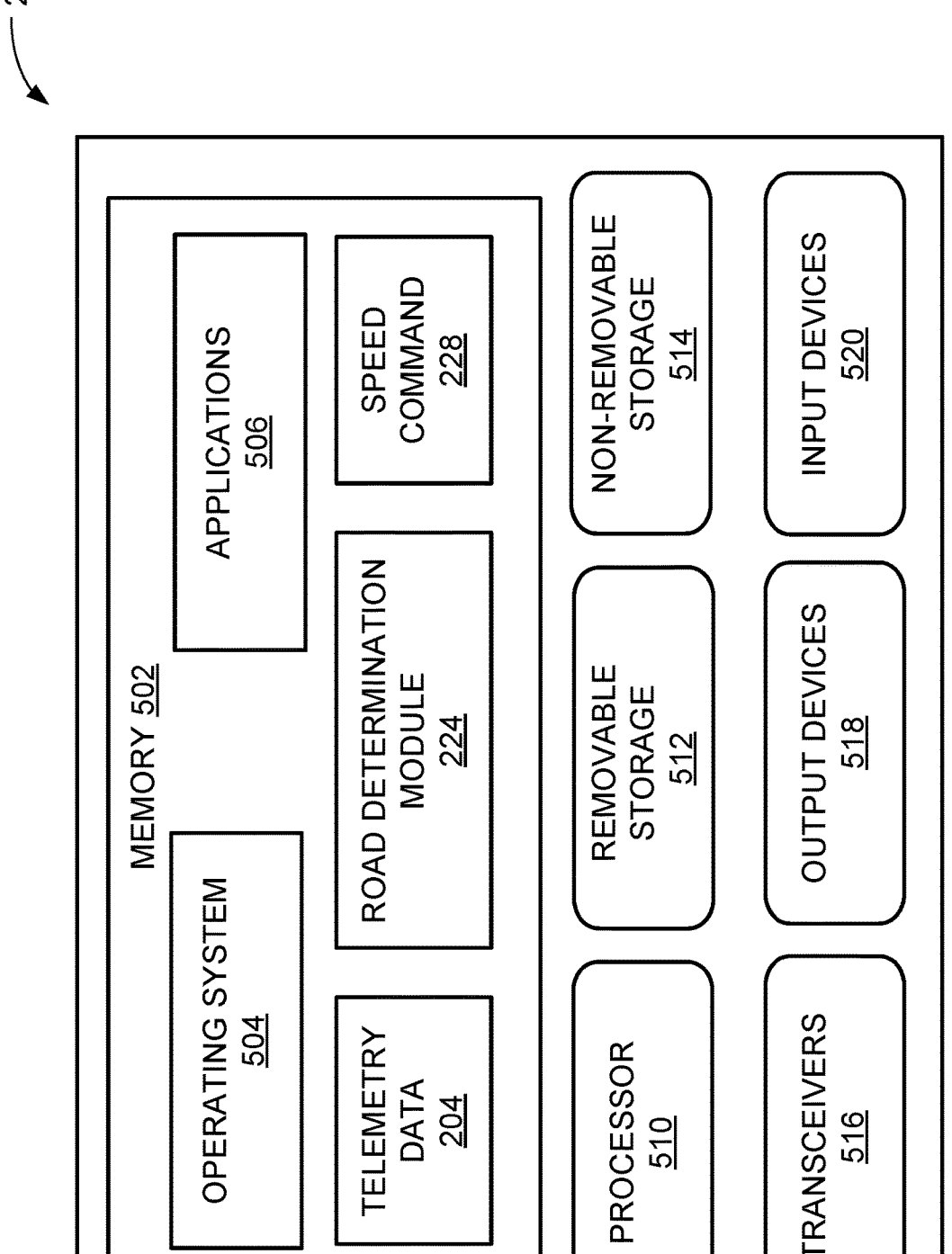
FIG. 5 is a schematic illustrating components of a route detector network, in accordance with various examples of the present disclosure.

FIG. 5 depicts a component level view of the route detector network 206 for use with the systems and methods described herein, in accordance with various examples of the present disclosure. The route detector network 206 could be any device capable of providing the functionality associated with the systems and methods described herein. The route detector network 206 can comprise several components to execute the above-mentioned functions. The route detector network 206 may be comprised of hardware, software, or various combinations thereof. As disclosed below, the route detector network 206 can comprise memory 502 including an operating system (OS) 504 and one or more standard applications 506. The standard applications 506 may include applications that generate the speed command 228, for example.

The route detector network 206 can also comprise one or more of removable storage 512, non-removable storage 514, transceiver(s) 516, output device(s) 518, and input device(s) 520. In various implementations, the memory 502 can be volatile (such as random access memory (RAM)), non-volatile (such as read only memory (ROM), flash memory, etc.), or some combination of the two. The memory 502 can include data pertaining to the telemetry data 204 received from the machines 200.

The memory 502 can also include the OS 504. The OS 504 varies depending on the manufacturer of the route detector network 206. The OS 504 contains the modules and software that support basic functions of the route detector network 206, such as scheduling tasks, executing applications, and controlling peripherals. The OS 504 can also enable the route detector network 206 to send and retrieve other data and perform other functions, such as issue the speed command 228 to the machines 200.

The route detector network 206 can also comprise one or more processors 510. In some implementations, the processor(s) 510 can be one or more central processing units (CPUs), graphics processing units (GPUs), both CPU and GPU, or any other combinations and numbers of processing units. The route detector network 206 may also include additional data storage devices (removable and/or non-removable) such as, for example, magnetic disks, optical disks, or tape. Such additional storage is illustrated in FIG. 5 by removable storage 512 and non-removable storage 514.

Non-transitory computer-readable media may include volatile and nonvolatile, removable and non-removable tangible, physical media implemented in technology for storage of information, such as computer readable instructions, data structures, program modules, or other data. The memory 502, removable storage 512, and non-removable storage 514 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the route detector network 206. Any such non-transitory computer-readable media may be part of the route detector network 206 or may be a separate database, databank, remote server, or cloud-based server.

In some implementations, the transceiver(s) 516 include any transceivers known in the art. In some examples, the transceiver(s) 516 can include wireless modem(s) to facilitate wireless connectivity with other components (e.g., between the route detector network 206 and one or more telemetry sensors of the machines), the Internet, and/or an intranet. Specifically, the transceiver(s) 516 can include one or more transceivers that can enable the route detector network 206 to send the speed command 228 and/or receive the telemetry data 204. The transceiver(s) 516 can enable the route detector network 206 to connect to multiple networks including, but not limited to 2G, 3G, 4G, 5G, and Wi-Fi networks. The transceiver(s) 516 can also include one or more transceivers to enable the route detector network 206 to connect to future (e.g., 6G) networks, Internet-of-Things (IoT), machine-to machine (M2M), and other current and future networks.

The transceiver(s) 516 may also include one or more radio transceivers that perform the function of transmitting and receiving radio frequency communications via an antenna (e.g., Wi-Fi or Bluetooth®). In other examples, the transceiver(s) 516 may include wired communication components, such as a wired modem or Ethernet port, for communicating via one or more wired networks. The transceiver(s) 516 can enable the route detector network 206 to facilitate audio and video calls, download files, access web applications, and provide other communications associated with the systems and methods, described above.

In some implementations, the output device(s) 518 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 518 can also include speakers, or similar devices, to play sounds or ringtones when an audio call or video call is received. Output device(s) 518 can also include ports for one or more peripheral devices, such as headphones, peripheral speakers, or a peripheral display.

In various implementations, input device(s) 520 include any input devices known in the art. For example, the input device(s) 520 may include a camera, a microphone, or a keyboard/keypad. The input device(s) 520 can include a touch-sensitive display or a keyboard to enable users to enter data and make requests and receive responses via web applications (e.g., in a web browser), make audio and video calls, and use the standard applications 506, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 520 and an output device 518.

Those of ordinary skill in the field will also appreciate that the principles of this disclosure are not limited to the specific examples disclosed or illustrated in the figures.

INDUSTRIAL APPLICABILITY

The present disclosure uses telemetry data received from machines operating on a work site to generate the location of, or update, roads used by the machines to generate travel networks. These travel networks may be used to provide for various advantage at a work site. For example, generating travel networks using telemetry data received from machines can provide for predicting energy use of battery powered machines, identify locations in which regenerative braking may be available to charge a battery used by a machine, display shift-based and extended travel networks, maintaining an existing virtual model to optimize production recording, metrics, and assignments, defining a travel network using basic telemetry from staffed machines, and define a travel network for autonomous machines from the basic telemetry recorded for staffed machines. The location and state of all machines at a work site can be monitored in real time as part of the operation of a work site management system. Locations of the work site in which machines stop or reverse can be identified from within the raw data by observing velocity and payload states. Locations at which machines stop and reverse are clustered using spatial clustering techniques. Identified clusters can then classified as a dump area, a load area, or a stockpile area, for example, based on the observed activities of machines inside these locations. Locations can be re-evaluated and tracked over time to enable the model to be updated as operations proceed.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A method of detecting a road, the method comprising:
receiving first telemetry data from a first machine, the first telemetry data comprising a plurality of first positions of the first machine along a first travel path from an origination location to a destination location;
receiving second telemetry data from a second machine, the second telemetry data comprising a plurality of second positions of the second machine along a second travel path from the origination location to the destination location;
identifying a first type of the first machine and a second type of the second machine;
identifying the first travel path as being traveled by the first type of the first machine;

identifying the second travel path as being traveled by the second type of the second machine;
determining that the plurality of first positions along the first travel path and the plurality of second positions along the second travel path comprises a similar trajectory; and
based on determining that the plurality of first positions along the first travel path and the plurality of second positions along the second travel path comprises the similar trajectory, identifying the similar trajectory as the road.

2. The method of claim 1, wherein the first telemetry data or the second telemetry data further comprises a loading area, a dumping area, a fuel bay, or a charge station.

3. The method of claim 1, wherein the first telemetry data or the second telemetry data further comprises percent grade data along the road between the origination location and the destination location.

4. The method of claim 3, further comprising:
identifying at least one decline using the percent grade data;
determining that the at least one decline is sufficient to provide for regenerative braking for a machine; and
identifying the at least one decline as a regenerative braking segment.

5. The method of claim 4, further comprising:
identifying at least one incline using the percent grade data; and
predicting an energy use of a battery used to provide motive energy to the first machine based on the at least one incline and the at least one decline.

6. The method of claim 1, further comprising:
associating at least one of the plurality of first positions with a first time;
identifying a first shift associated with the first time; and
associating the first travel path of the road with the first shift.

7. The method of claim 6, further comprising:
associating at least one of the plurality of first positions with a second time;
identifying a second shift associated with the second time; and
associating the second travel path of the road with the second shift.

8. The method of claim 7, further comprising:
receiving third telemetry data from a third machine, the third telemetry data comprising a plurality of third positions of the third machine along a third travel path from the origination location to the destination location, wherein at least one of the plurality of third positions is associated with a third time;
determining that the plurality of third positions along the third travel path comprises a similar trajectory to the road;
based on determining that the third travel path comprises the similar trajectory to the road, associating the third travel path with the road;
identifying a third shift associated with the third time; and
associating the third travel path of the road with the third shift.

9. The method of claim 8, further comprising building a shift-based travel network wherein the shift-based travel network identifies a travel time associated with the first travel path, the second travel path, or the third travel path.

10. The method of claim 1, further comprising:
receiving fourth telemetry data from a fourth machine, wherein the fourth machine comprises the first type;

determining if the fourth telemetry data is within a degree of error of the first travel path;

if the fourth telemetry data is within the degree of error of the first travel path, updating the road with the fourth telemetry data; and if the fourth telemetry data is not within the degree of error of the first travel path, generating a warning identifying a potential deviation of travel of the fourth machine.

11. The method of claim 1, further comprising identifying an intersection of the road and one or more second roads along the road.

12. The method of claim 11, further comprising:

receiving first data that the first machine traveling along the road and a fifth machine traveling along a second road of the one or more second roads are approaching the intersection;

issuing a first speed command to the first machine to travel at a lower speed;

receiving second data that the fifth machine has traveled through the intersection; and issuing a second speed command to the first machine to travel at a higher speed.

13. A network, comprising:

a memory storing computer-executable instructions; and a processor in communication with the memory, the computer-executable instructions causing the processor to perform acts comprising:

receiving first telemetry data from a first machine, the first telemetry data comprising a plurality of first positions of the first machine along a first travel path from an origination location to a destination location;

receiving second telemetry data from a second machine, the second telemetry data comprising a plurality of second positions of the second machine along a second travel path from the origination location to the destination location;

identifying a first type of the first machine and a second type of the second machine;

identifying the first travel path as being traveled by the first type of the first machine;

identifying the second travel path as being traveled by the second type of the second machine;

determining that the plurality of first positions along the first travel path and the plurality of second positions along the second travel path comprises a similar trajectory; and based on determining that the plurality of first positions along the first travel path and the plurality of second positions along the second travel path comprises the similar trajectory, identifying the similar trajectory as a road.

14. The network of claim 13, wherein the first telemetry data or the second telemetry data further comprises a loading area, a dumping area, a fuel bay, or a charge station.

15. The network of claim 13, wherein the first telemetry data or the second telemetry data further comprises percent grade data along the road between the origination location and the destination location, and wherein the computer-executable instructions further comprise computer-executable instructions causing the processor to:

identify at least one decline using the percent grade data;

determine that the at least one decline is sufficient to provide for regenerative braking for a machine;

identify the at least one decline as a regenerative braking segment;

identify at least one incline using the percent grade data; and predict an energy use of a battery used to provide motive energy to the first machine based on the at least one incline and the at least one decline.

16. The network of claim 13, wherein upon executing the computer-executable instructions, the processor is configured to:

identify an intersection along the road, wherein the intersection comprises a location of overlap between the road and a second road;

receive first data that the first machine traveling along the road and a fifth machine traveling along the second road are approaching the intersection;

issue a first speed command to the first machine to travel at a lower speed;

receive second data that the fifth machine has traveled through the intersection; and issue a second speed command to the first machine to travel at a higher speed.

17. A non-transitory computer-readable media storing computer-executable instructions that, when executed by one or more processors, cause the one or more processors to perform operations comprising:

receiving first telemetry data from a first machine, the first telemetry data comprising a plurality of first positions of the first machine along a first travel path from an origination location to a destination location;

receiving second telemetry data from a second machine, the second telemetry data comprising a plurality of second positions of the second machine along a second travel path from the origination location to the destination location;

identifying a first type of the first machine and a second type of the second machine;

identifying the first travel path as being traveled by the first type of the first machine;

identifying the second travel path as being traveled by the second type of the second machine;

determining that the plurality of first positions along the first travel path and the plurality of second positions along the second travel path comprises a similar trajectory; and based on determining that the plurality of first positions along the first travel path and the plurality of second positions along the second travel path comprises the similar trajectory, identifying the similar trajectory as a road.

18. The non-transitory computer-readable media of claim 17, wherein the computer-executable instructions that, when executed by the one or more processors, cause the one or more processors to perform operations comprising:

associating at least one of the plurality of first positions with a first time;

identifying a first shift associated with the first time;

associating the first travel path of the road with the first shift;

associating at least one of the plurality of first positions with a second time;

identifying a second shift associated with the second time; and associating the second travel path of the road with the second shift.

19. The non-transitory computer-readable media of claim 17, wherein the computer-executable instructions that, when executed by the one or more processors, cause the one or more processors to perform operations comprising:

identifying a first curve of an area of the first travel path;

determining that the first curve is unusable by the first machine;

modifying the road in the area by:

excluding the first machine from traveling through the area; and limiting a speed or weight of the first machine when traveling through the area; or adjusting the road in the area to have a second curve usable by the first machine.

\* \* \* \* \*